United States Patent [19]

Marcus

[11] 3,926,470

[45] Dec. 16, 1975

[54] VISOR ASSEMBLY
[75] Inventor: Konrad H. Marcus, Holland, Mich.
[73] Assignee: Prince Corporation, Holland, Mich.
[22] Filed: Mar. 21, 1973
[21] Appl. No.: 343,198

[52] U.S. Cl............. 296/97 B; 240/4.2; 296/97 H; 350/276
[51] Int. Cl.².......................................... B60J 3/00
[58] Field of Search............ 296/97 H, 97 B, 97 R; 224/29 A; 240/4.2; 350/276

[56] References Cited
UNITED STATES PATENTS

| 1,990,413 | 2/1935 | Michaelis | 224/29 A |
|---|---|---|---|
| 2,148,557 | 2/1939 | Hook | 224/29 A |
| 3,751,106 | 3/1975 | Mahler | 296/97 H |

FOREIGN PATENTS OR APPLICATIONS

| 474,381 | 8/1969 | Switzerland | 296/97 H |
| 1,099,694 | 1/1968 | United Kingdom | 296/97 R |
| 864,091 | 3/1961 | United Kingdom | 296/97 H |
| 1,068,571 | 7/1957 | Germany | 296/97 R |
| 722,391 | 5/1942 | Germany | 296/97 B |

Primary Examiner—Robert J. Spar
Assistant Examiner—Donald W. Underwood
Attorney, Agent, or Firm—Hugh L. Fisher

[57] ABSTRACT

A visor assembly incorporating a padded visor provided with a built-in lighted vanity mirror. The visor assembly also includes a padded cover which when opened uncovers the mirror and also actuates a lighting system. The lighting system then illuminates an object such as an observer or a pap with a light intensity that can manually be varied.

6 Claims, 15 Drawing Figures

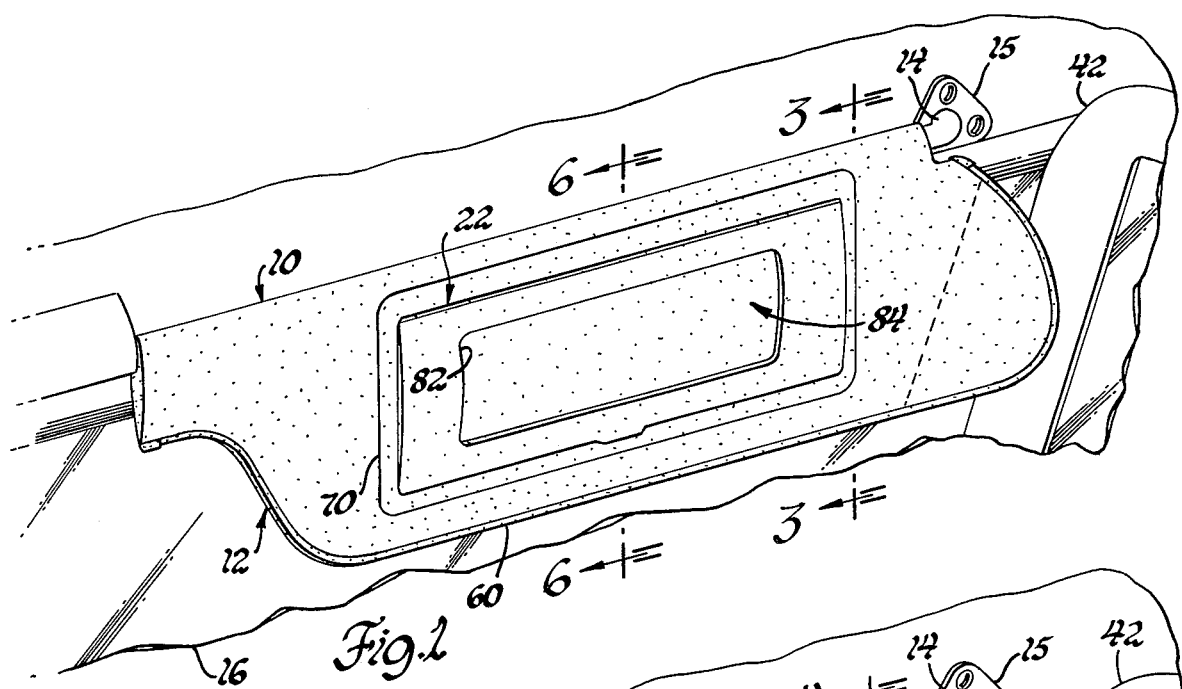
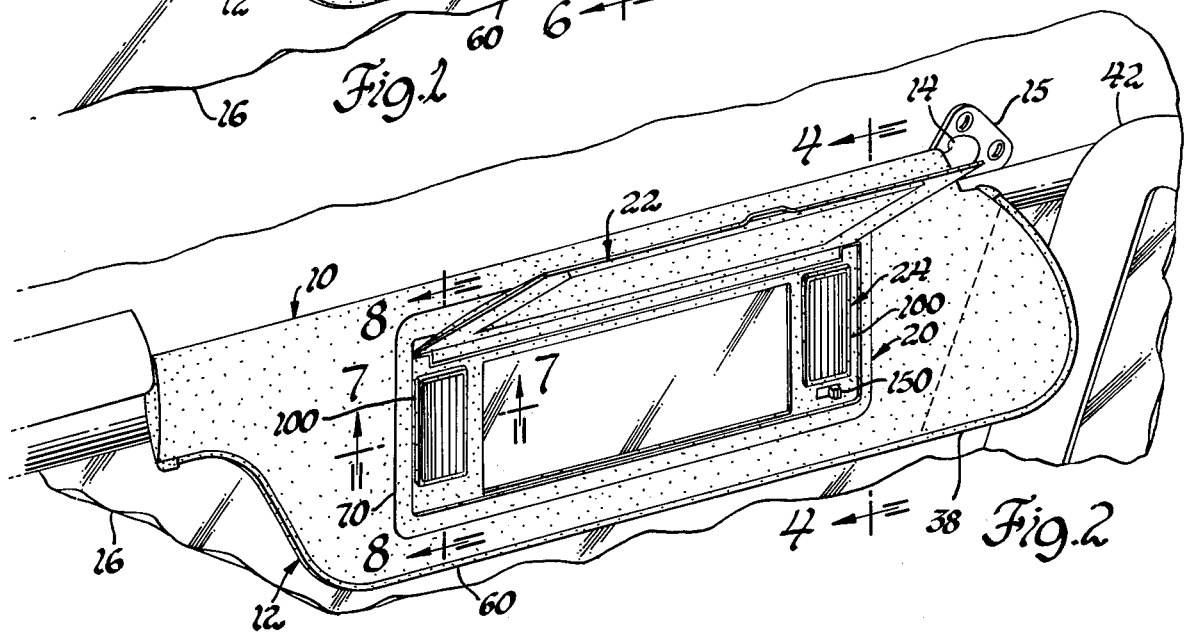
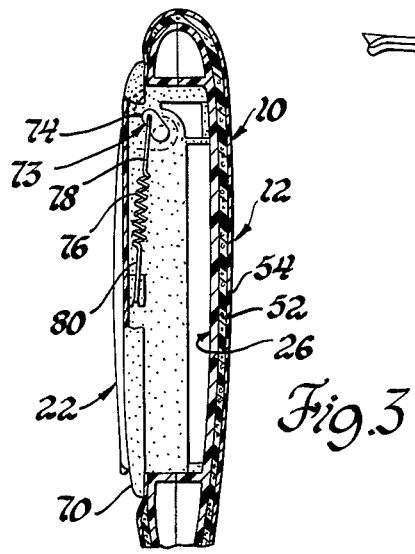
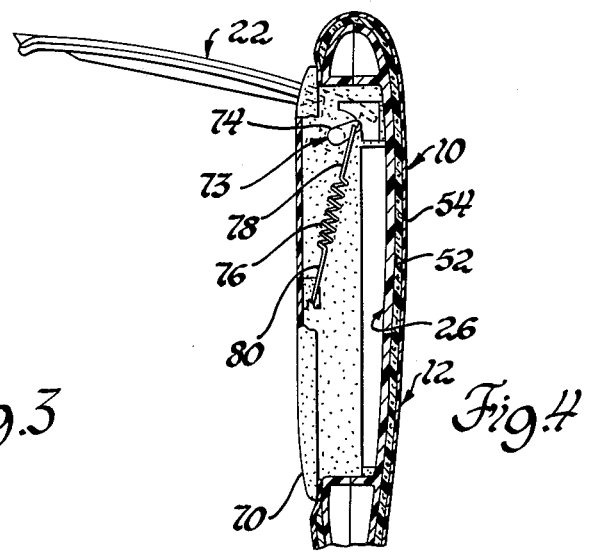

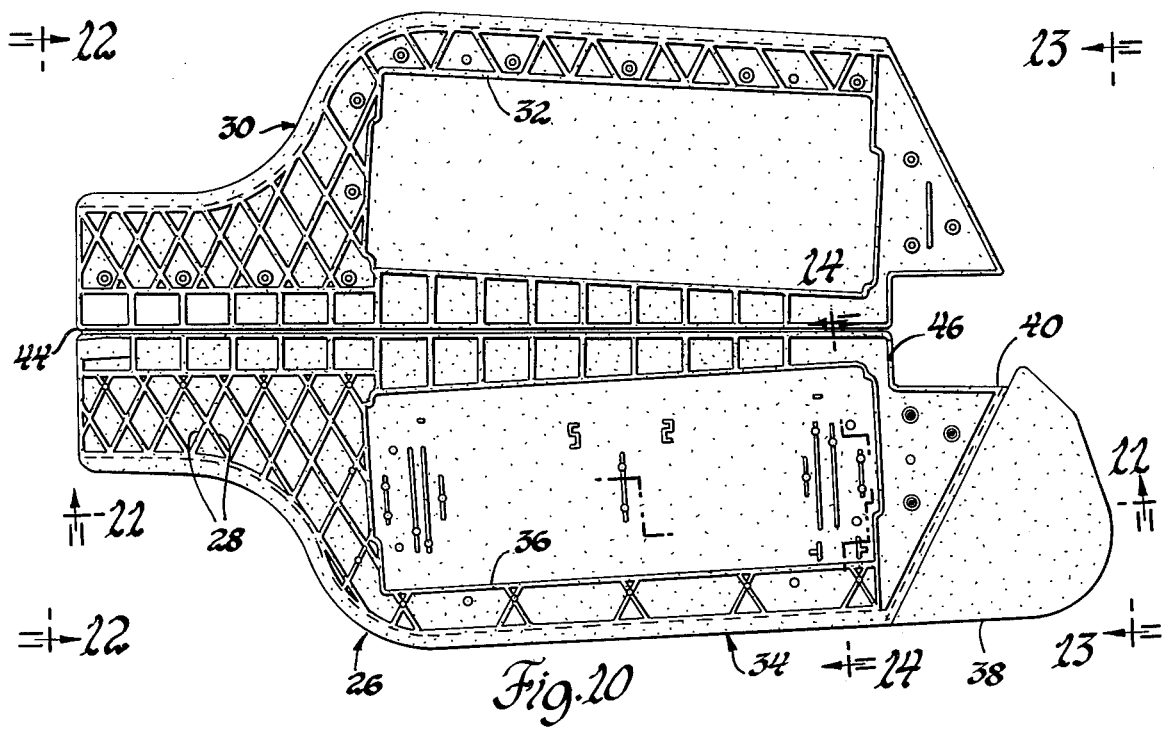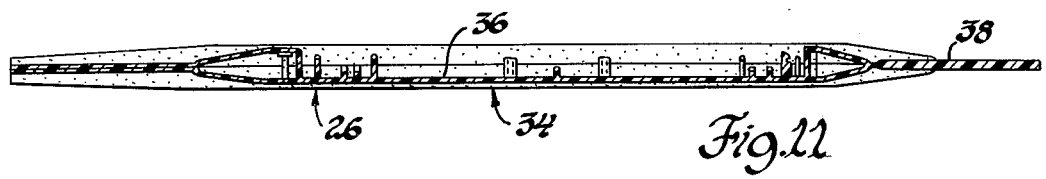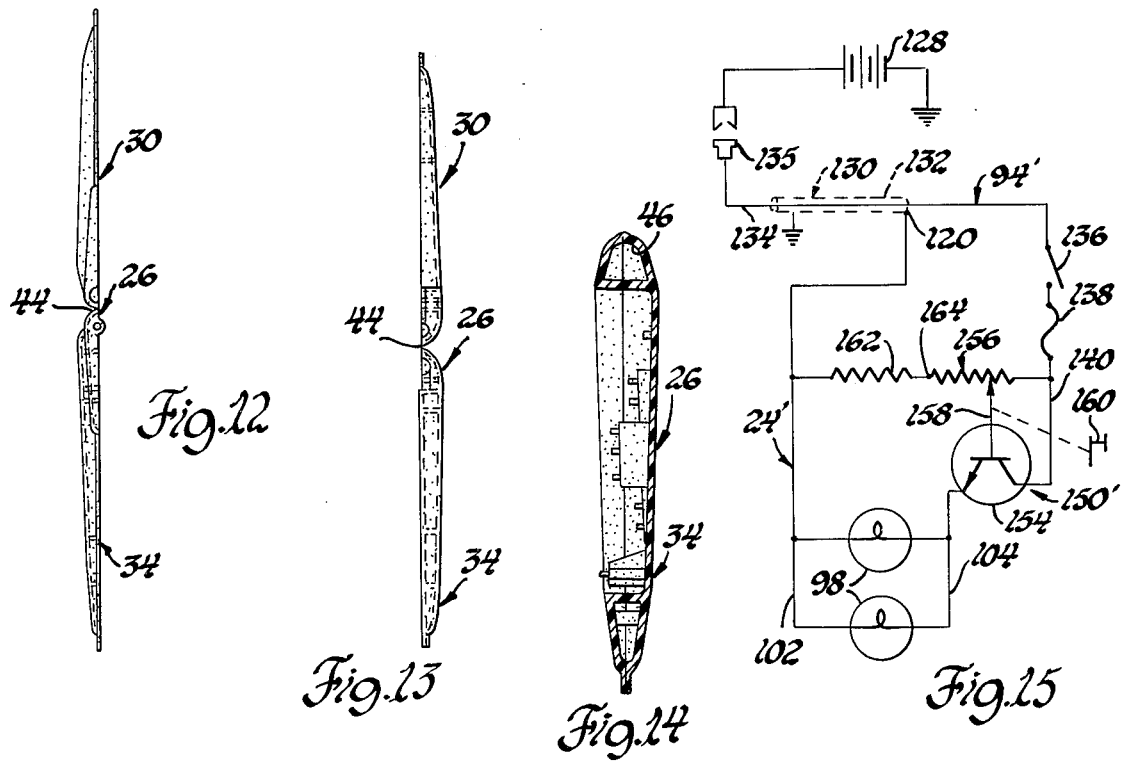

VISOR ASSEMBLY

This invention relates to improvements in visors adapted although not exclusively for use with vehicles.

Vehicle visors customarily shield the front seat occupant's eyes from the sun light. Because of their eye level location these visors have been found to be a convenient place to locate a vanity mirror which is usually done either by clamps or by attaching the mirror to the visor with an appropriate adhesive material. With such a vanity mirror, there are problems such as lack of illumination, particularly at night. Because an uncovered mirror can provide undesired reflections, it is usually not located on the driver's visor. Then too, an exposed vanity mirror can possibly present problems in the event of a crash.

With the foregoing in mind a new and different visor assembly is contemplated that includes a vanity mirror and a movable cover for the mirror.

Also, contemplated is a visor assembly having a lighted vanity mirror and a movable cover for the mirror.

Further contemplated is a visor assembly having a lighted vanity mirror with a unique lighting system that utilizes electric conductors which serve multiple functions inlcuding that of illumination reflectors and that are easily connected to an existing power source.

More specifically contemplated is a visor assembly having a lighted vanity mirror wherein the illumination can be varied and a movable mirror cover which when moved respectively to the open and closed positions relative to the mirror activates and deactivates a lighting system for the mirror.

Another object is the provision of a visor assembly comprising novel structure whereby the visor includes a recess for housing a vanity mirror and a lighting system therefor.

Also an object is the provision of a padded visor assembly having a visor that has a one piece core which is molded of a plastic like material in two integral sections which fold upon themselves to form the one piece core with a flexible end and includes a recess for housing a vanity mirror and a lighting system therefor.

A further objective is the provision of a visor assembly that has a core structure padding and a covering all adapted for mass production assembly for providing a compact, strong and lightweight unit.

Still another object is the provision of a vanity mirror with unique features that reduces the dispersion of small glass particles from the mirror if broken.

Other objects include the provision of a visor assembly having a vanity mirror with a hinged mirror cover that is releasably held in either its open or closed positions relative to the lighted vanity mirror; a visor assembly with a lighted vanity mirror and a lighting system that distributes the illumination towards an observer or an object and that can also be used for reading purposes; and a visor assembly that provides vanity mirror illumination with a minimum number of parts.

The foregoing and other objects and advantages of the invention will become apparent from the following description and from the accompanying drawings in which:

FIG. 1 is a perspective view of a visor assembly depicting a lighted vanity mirror with a cover in the closed position;

FIG. 2 is another perspective view of the FIG. 1 visor assembly with the mirror cover shown in the open position;

FIG. 3 is a sectional view of the visor assembly taken along line 3—3 in FIG. 1;

FIG. 4 is a sectional view of the visor assembly taken along line 4—4 in FIG. 2;

Figure 7:
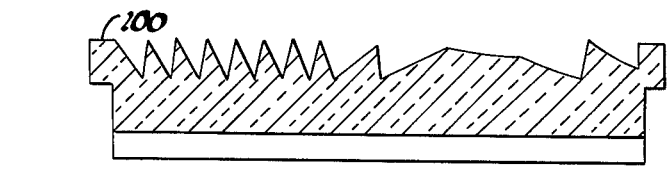
Figure 8:
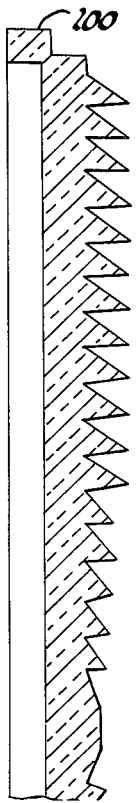
Figure 9:
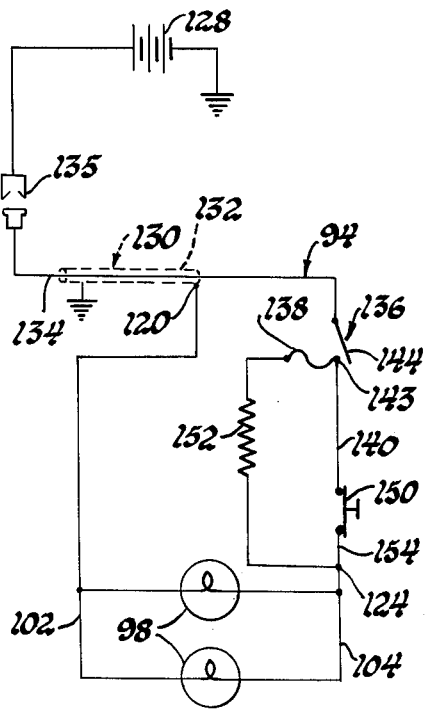

FIGS. 7 and 8 are sectional views taken respectively along the lines 7—7 and 8—8 in FIG. 2 of the lighting system lens;

FIG. 9 is a schematic diagram of the lighting system circuitry;

FIG. 10 is a plan view of the core employed by the visor assembly shown prior to being folded;

FIG. 11 is a view taken along lines 11—11 of FIG. 10;

FIGS. 12 and 13 are views of the FIG. 10 core shown looking in the direction respectively of arrows 12—12 and 13—13 in FIG. 10;

FIG. 14 is a sectional view of the FIG. 10 core taken along line 14—14 in FIG. 10; and FIG. 15 is a schematic diagram of a modification of the lighting system circuitry.

Referring first to FIGS. 1 and 2, the visor assembly incorporating the principles of the invention is denoted generally by the numeral 10 and is shown for demonstration purposes installed on the passenger's side of a vehicle although it could be installed on the driver's side or both. The visor assembly 10 includes a visor 12 that is swingably supported on a rod 14. This rod 14 has a swivel attachment 15 that is connected to the vehicle just above the vehicle windshield 16. Thus, in the usual way the visor 12 can be removed from the depicted position which affords light reflection from the windshield 16 to a stored position above the windshield 16 or swung sidewise, if desired, so as to provide a sunshield against light from the side. The visor assembly 10 further includes a vanity mirror 20, a vanity mirror cover 22, which is swingable between the FIG. 1 closed position and the FIG. 2 open position with respect to the vanity mirror 20 and a lighting system 24 for the vanity mirror 20. When the visor assembly 10 is in the FIG. 1 position, the vanity mirror cover 22 can be removed to the FIG. 2 open position so as to expose the vanity mirror 20 and also to actuate the lighting system 24 so as to illuminate the mirror 20.

Figure 6:
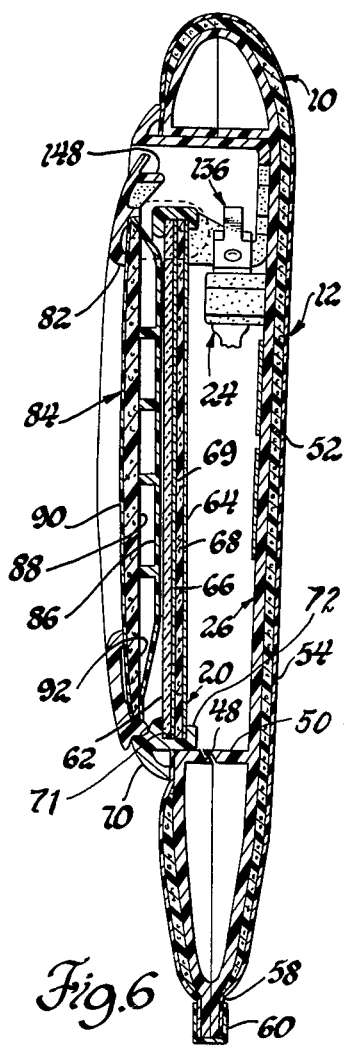
FIG. 6 is a sectional view of the visor assembly taken along line 6—6 in FIG. 1.

As best observed in FIG. 10, the visor 12 has a core 26 formed of a suitable material such as plastic; e.g., polypropylene or the equivalent. The core 26 is molded in one piece with the viewed rib structure comprising a series of ribs 28. These ribs 28 afford strength while minimizing the amount of plastic like material required. This core 26 has an open section 30 with a rectangular shaped through opening at 32 and a face section 34 provided with a face 36 of the same rectangular shape as the opening 32 and a flexible end 38 that is connected to the face section 34 by a so called live hinge 40. The hinge 40 is formed by reducing the cross-sectional area at this point so that the flexible end 38 can deflect, when the visor assembly 10 is in its stored position against the vehicle ceiling and cover a corner 42 viewed in FIG. 1 for safety purposes. The two sections 30 and 34 also have a similar "live" hinge at 44 that permits the two sections to be folded onto themselves as seen in FIG. 6. Additionally, the face section 34 includes a channel 46, best viewed in FIG. 14, for reception of the rod 14. The two sections 30 and 34 can be held together by any suitable interlocking provision; for instance, that depicted in FIG. 6 at 48 or by pins or both. When the two sections 30 and 34 are folded together, they provide a recess 50 defined by the opening 32 and the face 36. This recess 50 accomodates the vanity mirror 20 and the lighting system 24 as will be explained.

Figure 5:
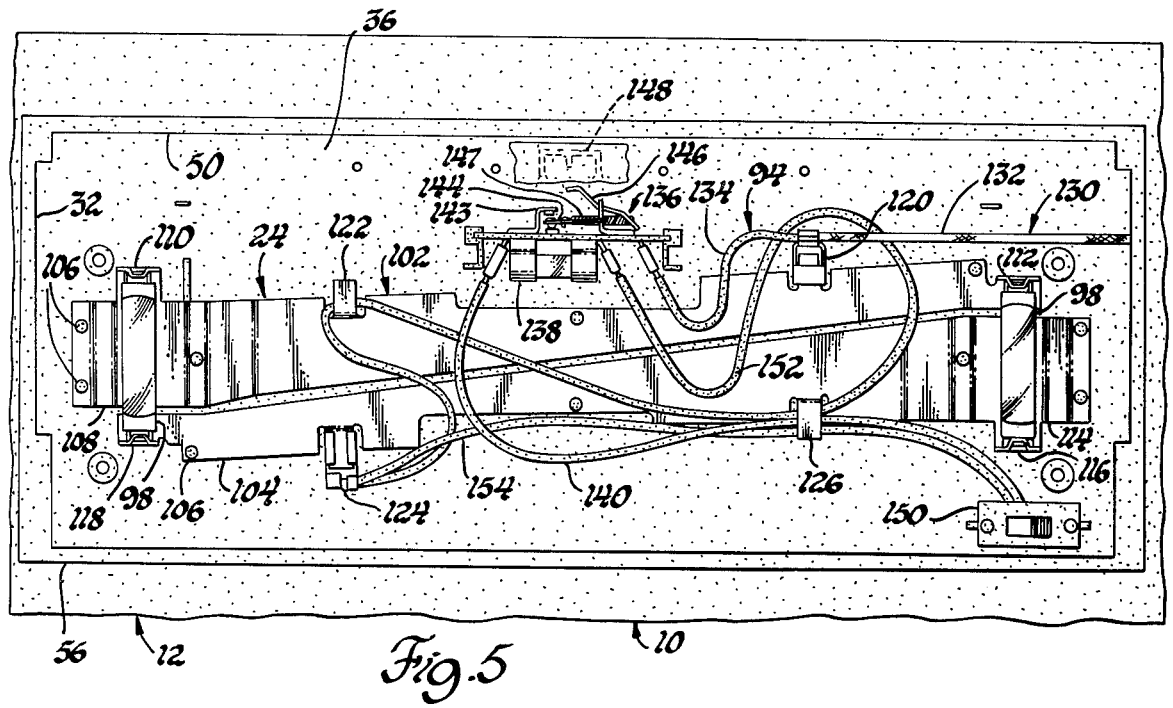
FIG. 5 is a view of the visor assembly with the vanity mirror removed so as to show the lighting system therefor.

As seen in FIG. 6, the core 26 has placed over it a padding 52 of any suitable material, such as Scott's No. 250 dielectric foam and then a covering 54 of some suitable material, such as cloth, leather, vinyl or the like. This covering 54 is cut to a shape that conforms to the contour of the core 26 and then, as observed in FIG. 5, is sealed around the recess 50 and in the area denoted generally by the numeral 56 in any suitable way such as by an adhesive material or by heat sealing; e.g., dielectric heating. In the same way the covering 54 can be sealed at its ends around the perimeter of the visor 12 at 58 after which a binding 60 is stitched or heat sealed to the perimeter 58. If preferred, the dielectric heating process can be used to provide embossing that will simulate the stitching.

As shown in FIG. 6, the vanity mirror 20 comprises a glass panel 62 which can be drawn window glass and a steel backing plate 64. The glass panel 62 has the customary reflective coating on its back surface 66. The attachment of the glass panel 62 to the steel backing plate 64 is made by an appropriate adhesive backing strip shown generally at 68. This strip 68 comprises, by way of example and without limitation, a polyvinyl chloride material of approximately four or five mills thickness, which is applied to both the glass panel back surface 66 and an opposite surface 69 on the steel backing plate 64 and an intermediate polyurethane foam material or the equivalent having a thickness of approximately 0.010 to 0.030 ins. With this construction, if the vanity mirror 20 is struck with a blow of sufficient magnitude to break the glass panel 62, the steel backing plate 64 will deflect and bend so as to absorb the impact and due to what might be called a "pipe bender effect," any broken glass particles which would otherwise fly-off the mirror face are retained in position relative to the backing plate 64 by the strip 68.

For suporting the vanity mirror 20 on the visor 12, a frame 70 is provided which fits within the visor recess 50 in such a way as to be releasably retained therein. This frame 70 can either be made of a metallic material or a non-metallic material; for instance, a suitable molded plastic material.

The vanity mirror 20 fits on each of its sides within channels 71 in the frame 70 and is retained in position by clamping edges 72, which are bent at installation to the depicted position.

The frame 70 also supports the vanity mirror cover 22 which is pivotally connected thereto by hinge connections 73 at each end of the cover 22. For holding the cover 22 in the FIG. 2 position and also in the FIG. 1 closed position, each hinge connection 73 is provided with an offset arm 74 that pivots with the cover 22 and a spring 76 which has its opposite ends 78 and 80 respectively connected to the offset arm 74 and the frame 70 such that the tension of the spring 76, as best observed in FIGS. 3 and 4, holds the cover 22 in its closed and open depicted positions.

The cover 22 is constructed so as to have a rectangular shaped opening 82 therein for exposing a padded assembly 84 comprising a backing member 86 having the general shape of the opening 82, a padded strip 88, and a cover 90. The padded strip 88 and the cover 90 can be made of the same materials as the padding 52 and the covering 54 and the backing member 86 can be made of the same material as the core 26. The padded assembly 84 is larger than the rectangular shaped opening 82 so as to provide an overlap 92 around the perimeter thereof which overlap 92 can have applied thereto an appropriate adhesive material so as to retain the padded assembly 84 in place on the cover 22. One should be mindful that the entire cover 22 could be padded and covered if preferred in a way similar to that described with respect to the core 26.

The lighting system 24 comprises circuitry 94, which is positioned within the visor recess 50 and joined to the visor face 36, a pair of lamps 98, and a pair of lens 100. The lens 100 are releasably supported in complementary openings located in the vanity mirror frame 70 on each side of the vanity mirror 20. The lens 100 are each constructed so as to direct the light towards the center of the mirror 20 to provide greater concentration of illumination and also are constructed to prevent the illumination from straying and producing undersired reflections.

The circuitry 94 includes a ground conductor 102 and a power conductor 104, both of which are joined to the face 36 by a series of plastic plugs 106 upstanding from the face 36 so that the two conductors 102 and 104 are aligned as shown in FIG. 5. These conductors 102 and 104 are formed of a thin metallic material, such as a stainless steel sheet having relatively good current conducting characteristics. The ground conductor 102 has a reflector 108 provided at one end along with a contact 110 and at the other end a contact 112. The power conductor 104 likewise has a reflector 114 and a contact 116 at one end and a contact 118 at the opposite end. The ground conductor 102 has a terminal 120 and a conductor retaining hook 122 whereas the power conductor 104 has a terminal 124 and a conductor retaining hook 126. The pair of lamps 98 are installed opposite the reflectors 108 and 114 with one of the lamps 98 being connected the contacts 110 and 118 and the other of the lamps 98 being connected between the contacts 112 and 116. These conductors 102 and 104 not only transfer current, but reflect light, deflect heat, serve as a heat sink and additionally, support the various other conductors employed by the circuitry 94, and thus, eliminate a substantial number of parts.

The circuitry 94 provides for the selective supply of power thereto from a conventional vehicle battery 128 (see FIG. 9) or the like by way of a coaxial cable shown generally at 130 which extends through the interior of the swivel attachment 15 and to the recess 50. The coaxial cable 130 comprises an outer conductor 132 formed of a conductive material, such as a braided metallic sheath, that is appropriately grounded and also connected to the ground conductor terminal 120 and an inner input conductor 134 that is coupled both to a connector 135, which is in turn connected to the battery 128, and to a selector switch 136. The selector switch 136, which provides for the selectivity, is coupled to a fuse 138 and an intermediate conductor 140 and to the terminal 124 of the power conductor 104. The conductor 140 is maintained in place by looping it around the hook 126 on the ground conductor 104 during installation. A resistance (not shown) may be installed between the battery 128 and the connector 135 for voltage control if desired.

The selector switch 136 comprises a fixed contact 143 which is coupled to the fuse 138, a movable contact 144 which is connected to the inner input conductor 134, and a cover actuated arm 146 which moves the movable contact 144 against the bias from a spring 147 to a closed position with respect to the fixed contact 143. To actuate the arm 146 the vanity mirror cover 22 is provided, as best viewed in FIGS. 5 and 6, with an extension 148, which urges the arm 146 downwardly as the cover 22 is moved to the open position. In this way the movable contact 144 is urged into engagement with the fixed contact 142 to complete the circuit from the battery 128 through the lamps 98 and provide the desired illumination.

For altering the intensity of the illumination from the lamps 98, the lighting system 24 further includes a light intensity varying provision including a dimmer switch 150, which is supported on the core face 36 and extends through a complementary opening in the vanity mirror frame 70, and a resistance conductor 152 which extends between the cover actuated selector switch 136 and the fuse 138 and the power conductor terminal 124 and shunt conductor 154, which extends from the dimmer switch 150 to the power conductor terminal 124. Both of the conductors 152 and 154 are retained in place by the hook 126 on the power conductor 104 whereas the conductor 152 is also retained in place by the hook 122 on the ground conductor. The resistance conductor 152 is of the well known type selected for the required resistance for illumination dimming purposes. This can best be explained by referring to the schematic circuit diagram in FIG. 9 for when the dimmer switch 150 is in the illustrated low position, the current flow is through the resistance conductor 152. Thus, the current flow is reduced and accordingly the energization of the lamps 98 so that the illumination is reduced. When the dimmer switch 150 is removed from the depicted high position in FIG. 9, the resistance conductor 152 is in effect shunted so that there is no reduction in the energization of the lamps 98 and accordingly they will provide the greatest illumination.

As viewed in FIGS. 7 and 8, the pair of lens 100 have a cross-sectional construction such that the illumination from the lamps 98 is directed towards the center of the mirror 20; i.e., towards an observer or an object to insure that the illumination does not stray or cause undesired lighting effects that might create a problem for the driver while still permitting one to use the vanity mirror.

In operation with the visor assembly 10 in its FIG. 1 position and the cover 22 closed, the visor assembly 10 and the cover being both padded provide an impact absorbing surface. When the vanity mirror 20 is to be used, the cover 22 is moved to the FIG. 2 open position which is approximately 120° from the plane of the visor 12. In moving to the open position, the cover extension 148 will actuate the selector switch 136 so as to activate the lighting system 24. The circuitry 94 will be completed to provide a current path from the battery 128 through the connector 135, the coaxial cable inner input conductor 134, the selector switch 136 and then enter through the fuse 138 and the resistance conductor 152 or the intermediate conductor 140, determined by the position of the dimmer switch 150, through the power conductor 104, the lamps 98, the ground conductor 102, the coaxial cable outer conductor 132 and then via ground back to the battery 128. Hence, both of the lamps 98 will be energized whereupon the illumination will be directed or deflected by the two lens 100 towards the center of the mirror 20; i.e., towards an observer or an object so that the vanity mirror 20 can be used. If the illumination is greater than desired, the dimmer switch 150 can be moved to the solid line position in FIG. 9. It should be noted that by tilting the visor assembly 10 approximately 45° from the vertical that the visor assembly 10 can now be used as a general purpose lamp; e.g., as a map light or for reading.

In FIG. 15 a modification of the FIG. 9 lighting system 24 is displayed. In FIG. 15 like parts are assigned the same numbers and similar parts the same number with a prime (') added. Hence, the numerals 24' and 94' respectively denote a lighting system and circuitry. The FIG. 15 light intensity vary provision includes a dimmer switch 150', such as an NPN transistor 154, and a variable resistor 156 having an adjustable tap 158 that is moveable by a manually moveable dimmer element 160, as those versed in the art will appreciate a PNP type transistor can be employed if the appropriate polarity changes are made. The transistor 154 has its emitter connected to the power conductor 104, its collector connected to the intermediate conductor 140 and its base coupled to the adjustable tap 158. The lighting system 24' further includes a fixed resistor 162 in series with the variable resistor 156.

In operation, the lighting system 24' accomplishes the same function as its counterpart in the FIG. 9 embodiment. When the selector switch 136 is closed, a circuit is completed from the battery 128 to the transistor 154. The bias of the transistor 154 is varied manually by the dimmer element 160 such that if the tap 158 is moved by the dimmer element 160 towards the contact 164, the forward bias is decreased so as to decrease conduction by the transistor 154, and accordingly, the current supplied to the lamps 98. Therefore, the illumination from the lamps 98 will be reduced. To increase the illumination from the lamps 98, the dimmer element 160 is adjusted so as to, in turn, move the tap 158 away from the contact 164 and thus, increase the forward bias on the transistor 154 so as to increase its conduction and correspondingly the current flow through these lamps 98. This will increase the illumination from the lamps 98.

From the foregoing it will be appreciated that because of the construction of the mirror 20, if the mirror 20 is struck, the glass panel 62 can shatter but with a minimum of dispersion of the shattered particles from the panel 62. Furthermore, the visor assembly 10 affords a lighted vanity mirror 20 that is only uncovered when it is to be used. Also the visor assembly 10 is particularly suited for mass production. One should be mindful too, that the construction permits versatility in selection of colors for different parts of the visor assembly 10.

What is claimed is:

1. A visor assembly for a vehicle or the like comprising a visor movably joined to the vehicle at the upper end thereof and having a recess, a frame supported by the recess, a vanity mirror supported by the frame, a vanity mirror cover, hinge means supporting said cover for hinging movement on the frame within the recess about an axis at the upper end of the visor between an open position and a closed position relative to said mirror, said hinge means including an offset portion disposed to one side of said axis when said cover is in an open position and at an opposite side of said axis when said cover is in a closed position, and bias means so connected to the offset portion so as to impose on the cover a force acting at one side of said axis for retaining the cover in the open position and a force at the opposite side of said hinge axis to maintain said cover in a closed position.

2. A visor assembly for a vehicle or the like comprising a visor, a vanity mirror supported by the visor, a vanity mirror cover, said visor including a recess and said vanity mirror including a frame removably positioned within the recess, means supporting said vanity mirror cover on said frame and within said recess for hinging movement about an axis between a closed position covering the mirror and an open position uncovering the mirror, said means including an offset portion disposed to one side of said axis when said cover is in said open position and at the opposite side of said axis when said cover is in said closed position, and bias means interconnected between the frame and the offset portion so as to impose bias forces on the cover for retaining the cover in the open and closed positions thereof.

3. A visor assembly for a vehicle or the like as described in cliam 2, wherein hinge means supports said cover on said visor frame for pivotal movement about an axis disposed above said mirror when said visor is disposed in a generally vertical plane, said cover being movable between a closed position covering the mirror to an open position uncovering the mirror.

4. A visor assembly for a vehicle or the like as described in claim 2 wherein said visor and said cover are padded.

5. A visor assembly for a vehicle or the like as described in claim 2 wherein the vanity mirror cover is pivotally supported on the frame.

6. A visor assembly for a vehicle or the like as described in claim 2 in which said frame is detachable connected to said visor.

* * * * *

UNITED STATES PATENT OFFICE
CERTIFICATE OF CORRECTION

Patent No. 3,926,470          Dated December 16, 1975

Inventor(s) Konrad H. Marcus

It is certified that error appears in the above-identified patent and that said Letters Patent are hereby corrected as shown below:

Column 1, line 27, delete "inlcuding" and insert --including--.

Column 4, line 45, after "connected" insert --between--.

Column 8, claim 3, line 6, delete "cliam" and insert --claim--.

Signed and Sealed this sixteenth Day of March 1976

[SEAL]

Attest:

RUTH C. MASON
*Attesting Officer*

C. MARSHALL DANN
*Commissioner of Patents and Trademarks*